Figure 1:
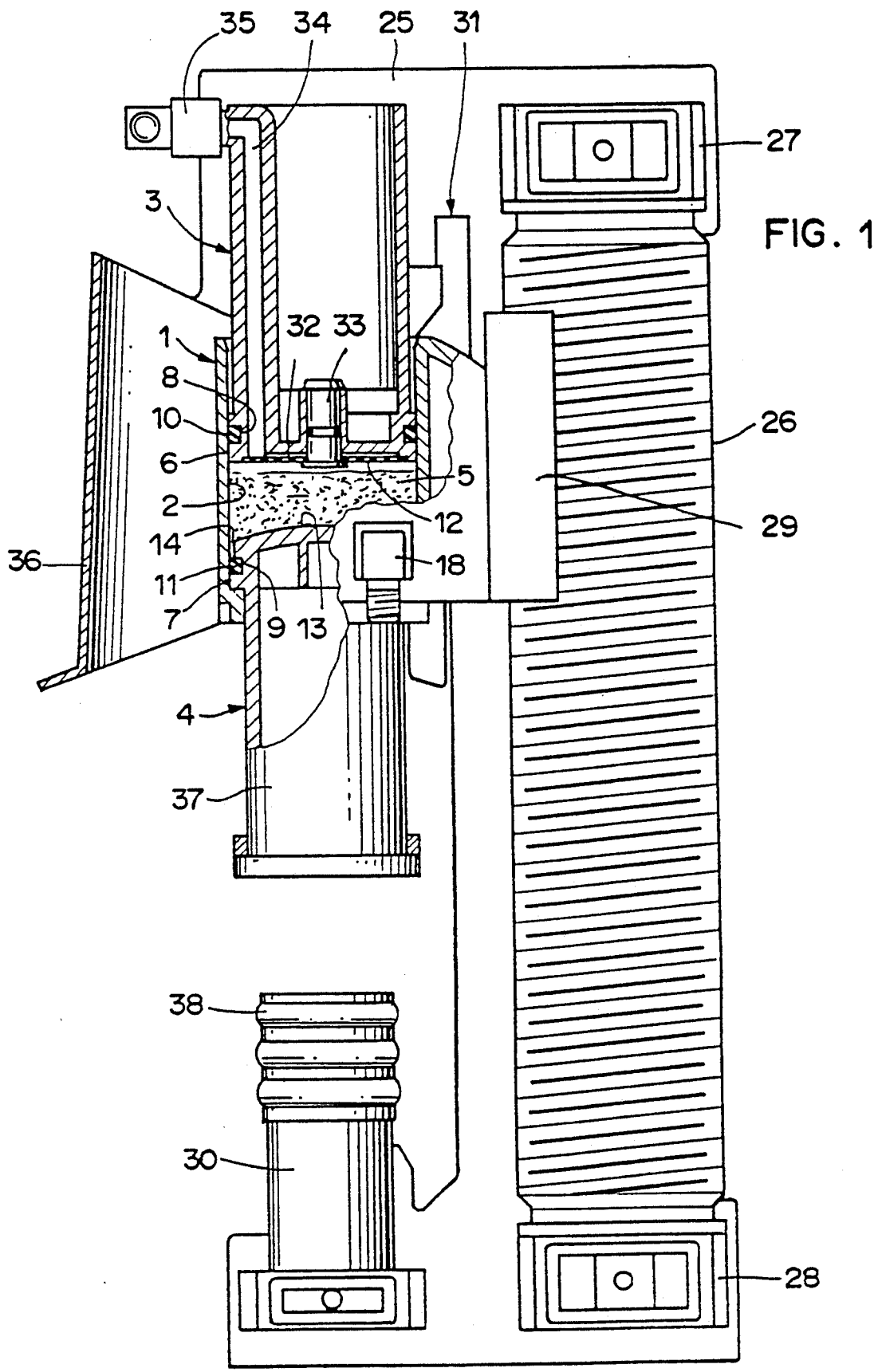

United States Patent [19]

Lüssi et al.

[11] Patent Number: 5,307,734
[45] Date of Patent: May 3, 1994

[54] BREWING APPARATUS FOR A COFFEE MACHINE

[75] Inventors: André Lüssi; Hans Zurbuchen, both of Wabern; Jürg von Gunten, Grosshöchstetten, all of Switzerland

[73] Assignee: Sintra Holding AG, Switzerland

[21] Appl. No.: 30,216

[22] PCT Filed: Jul. 28, 1992

[86] PCT No.: PCT/CH92/00157
§ 371 Date: Mar. 25, 1993
§ 102(e) Date: Mar. 25, 1993

[87] PCT Pub. No.: WO93/02607
PCT Pub. Date: Feb. 18, 1993

[51] Int. Cl.$^5$ .............................................. A47J 31/00
[52] U.S. Cl. ........................... 99/287; 99/289 R; 99/302 R
[58] Field of Search ............. 99/287, 289 R, 297, 99/300, 302 R, 302 P; 426/433

[56] References Cited

U.S. PATENT DOCUMENTS

| | | | |
|---|---|---|---|
| 3,760,712 | 9/1973 | Rossi | 99/289 |
| 4,457,216 | 7/1984 | Dremmel | 99/287 |
| 4,797,296 | 1/1989 | Meier | 99/289 R |
| 4,852,472 | 8/1989 | In-Albon | 99/289 R |

FOREIGN PATENT DOCUMENTS 217198 4/1987 European Pat. Off.
2452905 10/1980 France.
9110391 7/1991 PCT Int'l Appl.

Primary Examiner—Robert W. Jenkins
Attorney, Agent, or Firm—Pearne, Gordon, McCoy & Granger

[57] ABSTRACT

A brewing apparatus has a brewing cylinder (1) with a cylindrical bore (2) and two pistons (3, 4). The brewing cylinder (1) and the pistons (3, 4) are disposed displaceably relative to one another. In a brewing position the brewing cylinder (1) and the two pistons (3, 4) within the latter form a brewing chamber (5) in order to scald ground coffee therein through the feed of pressurized water. This water is fed to the brewing chamber (5) via a connection fitting (18) and via a through bore which extends through the wall of the brewing cylinder (1), into an annular gap (14) which is formed between a gasket (11) and the end face (13) of the second piston (4) facing the brewing chamber (5). Via a strainer (32), a conduit (34), and a further connection fitting (35), the coffee is discharged. Through the arrangement of the gap (14), the face (13) of the second piston (4) can be made without a strainer. The feeding of pressurized water to the gap (14) causes a self-cleaning effect in the latter. Through the strainer-less design of the end face (13) of the second piston (4), not only can a wearing part be eliminated, but a more cost-effective manufacture of the brewing apparatus can also be carried out.

8 Claims, 2 Drawing Sheets

BREWING APPARATUS FOR A COFFEE MACHINE

The present invention relates to a brewing apparatus for a coffee machine comprising a brewing cylinder (1) having a cylindrical bore (2), a pair of pistons (3,4) mounted within and closing the cylinderical bore (2) to form a brewing chamber (5), the brewing cylinder (1) and the pistons (3, 4) being displaceable relative to one another along a brewing cylinder axis (16) and each of the pistons (3, 4) having on its outside surface (6, 7) a groove (8, 9) extending about the entire circumference with an inserted gasket (10, 11) for sealing the piston (3, 4) in relation to the cylindrical bore (2).

The preparation of coffee by means of coffee machines is carried out according to different processes which may be separated into two basic types. A first type of process, in which the hot water runs through the ground coffee in a filter solely owing to gravity, is distinguished from a second type of process, in which the hot water is conveyed through the ground coffee under pressure (espresso or pressure-brewing process). The present invention relates to the last-mentioned pressure-brewing process. For carrying out this process automatically, various coffee machines are already known. These customarily have a brewing cylinder with a cylindrical bore which is closable at both ends by means of one piston each for forming a brewing chamber, the brewing cylinder and the pistons being displaceable relative to one another in the brewing cylinder axis. Each of the pistons has moreover a fine-meshed strainer on its end face turned toward the brewing chamber formed. Through one strainer, there is conveyed into the brewing chamber hot water under pressure which flows around and scalds the ground coffee, the coffee thus produced being discharged through the strainer of the other piston. The said strainers are subjected both to fouling (clogging) and to wear and tear and must not only be regularly cleaned but also exchanged from time to time. They are relatively expensive during manufacture.

It is the task of the present invention to create a brewing apparatus for a coffee machine in which the above-mentioned drawbacks are no longer present. In particular, it is a matter of decreasing the number of wearing parts in a brewing apparatus, which also include the said strainers.

The solution of this problem takes place by means of a brewing apparatus for a coffee machine which has the features that at least one of the pistons (4) has a reduced diameter between an end face (13) and its gasket to provide an annular gap (14) between the piston (4) and the bore (2) whereby said gap provides an annular passage for the feeding and/or discharge of liquid to and-/or from the brewing chamber (5).

In at least one of the pistons, the end face turned toward the brewing chamber does not have any more strainer. The feeding or discharge of liquid takes place via the annular gap provided. The formation of such a gap is substantially more cost-effective during manufacture than providing a piston end face with a fine-meshed strainer. The solution is particularly advantageous when at least that piston at which the water under pressure is fed to the brewing chamber, and which furthermore is intended for ejecting the leached-out ground coffee from the brewing chamber, the piston end face is designed without a strainer. Through the feeding of water under pressure to the annular gap, a self-cleaning effect of the latter occurs during each brewing operation, and upon stripping from the end face of the said piston the ground coffee customarily pressed into a cake, leached out, and ejected from the brewing chamber, no strainer fouling can be brought about.

Expediently, the wall of the brewing cylinder has, for the feeding and/or discharging of liquid via the said gaps to and/or from the brewing chamber, through bores running approximately at right angles to the brewing cylinder axis, which bores, in the brewing positions of the pistons, are disposed in the region of the gaps. The through bores may each be provided on the outside of the brewing cylinder with a connection fitting for connecting one liquid conduit each.

A particularly uniform flow-through of the ground coffee in the brewing chamber is achieved when the through bore through the wall of the brewing cylinder is directed substantially tangent to the bore of the brewing cylinder. Thereby, the pressurized water supplied does not strike the outer surface of the respective piston forming the gap at right angles but rather flushes through the gap substantially screw-threadedly while preventing turbulences.

It is likewise provided to design the outer surface areas bordering on the end faces of the two pistons in such a way that one annular gap each is formed toward the wall of the bore of the brewing cylinder. An excellent self-cleaning effect of the two gaps might then take place if the feeding or discharge of the liquid from the brewing chamber were intermittently reversed. This could be achieved relatively simply by means of a control device and a reversing valve customarily associated with every brewing apparatus.

By means of figures, the present invention is hereafter described in more detail by way of example.

Figure 2:
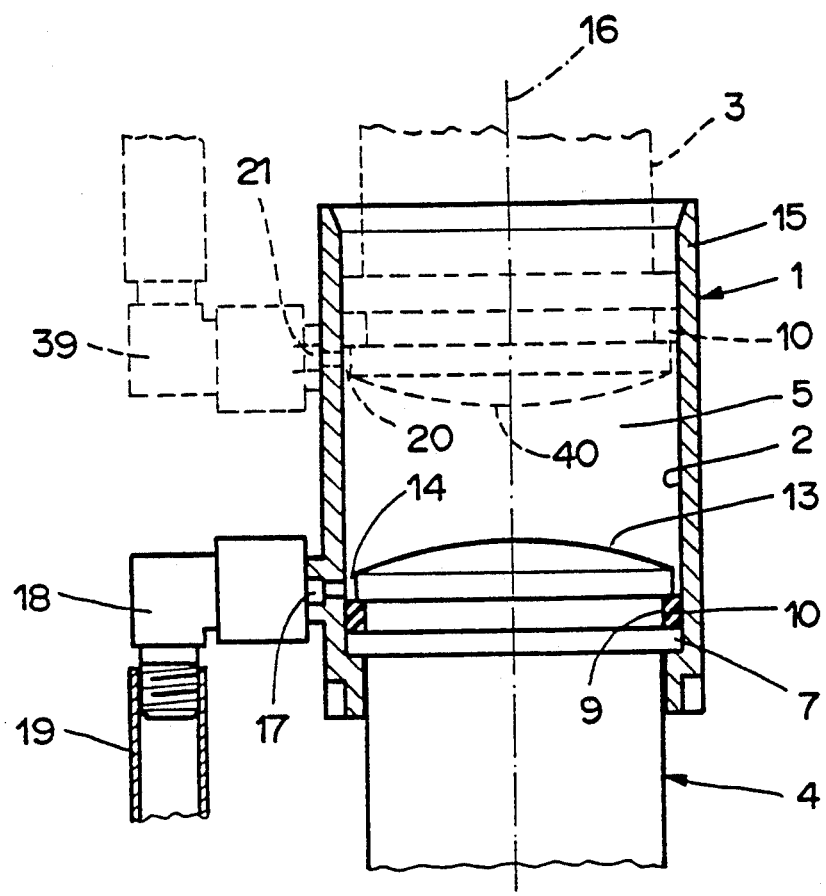

FIG. 1 shows a partial longitudinal section, viewed from the side, through a brewing apparatus depicted in the brewing position, in which the end face of one piston is designed without a strainer, and FIG. 2 shows an enlarged representation of the piston end designed without a strainer in the brewing cylinder, a design of the other piston without a strainer as well being indicated in broken lines.

In the longitudinal section viewed from the side in FIG. 1 through the brewing apparatus shown in the brewing position, there is characterized by the reference numeral 1 a brewing cylinder which has a cylindrical bore 2. A first piston 3 is fixed between two parallel sidewalls of the brewing apparatus, only one of which, 25, is visible in the figure. The brewing cylinder 1 is disposed displaceably along a driving spindle 26 which is rotatably mounted between a first driving-spindle bearing 27 and a second driving-spindle bearing 28. The driving spindle 26 has a spindle thread which is operatively connected to a follower part 29 that extends from the brewing cylinder 1 toward the driving spindle 26. Held displaceably in the brewing cylinder 1 is a second piston 4. The second piston 4 has a hollow-cylindrical shank 37 projecting out of the brewing cylinder 1 in the position shown in FIG. 1. On the one hand, the displacement range of the second piston 4 within the brewing cylinder 1 is limited by this shaft 37. On the other hand, the hollow-cylindrical shank 37 is intended, upon resetting of the brewing cylinder 1 from the brewing position shown in FIG. 1 into a discharge position, upon striking a braking connecting piece 30, particularly its end provided with O-rings 38 facing the brewing cylinder 1, to slow temporarily the resetting movement in relation to that of the brewing cylinder 1. The second piston 4 is thereby displaced within the brewing cylinder 1 toward the end of the brewing cylinder 1 meanwhile released from the first piston 3. The ground coffee 5 leached out by the previous brewing operation is at the same time ejected from the brewing cylinder 1 and removed from the end face 13 of the second piston 4 by a stripping device 31, only indicated, which is caused to carry out a swivel movement.

The brewing cylinder 1 is subsequently moved upward into a resting or filling position. It is ready to receive fresh ground coffee via a swivelingly disposed filling hopper 36 which is then in a retracted position.

In the brewing position shown in FIG. 1, a closed brewing chamber 5, in which ground coffee is enclosed, has been formed within the brewing cylinder 1 by the first piston 3 and by the second piston 4. For sealing the brewing chamber, each of the pistons 3, 4 has on its cylindrical outside surface 6, 7 one gasket 10, 11 each, each inserted in a groove 8, 9 which is relatively near the end face 12, 13 of the respective piston 3, 4. The end face 12 of the first piston 3 is provided in the exemplified embodiment shown in FIG. 1 with a strainer 32. This strainer is fastened to the first piston 3 by an attachment clip 33. The end face 13 of the second piston 4 facing the brewing chamber 5 has no strainer. The cylindrical region of the outside surface of the second piston 4 between the end face 13 and the associated gasket 11 is reduced in diameter compared with the diameter of the bore 2 of the brewing cylinder 1. An annular gap 14 is thereby formed between the wall of the bore 2 and the outside surface of the second piston 4 in the said region. Via a connection fitting 18 and a through bore, not visible in this figure, through the wall of the brewing cylinder 1, water under pressure is supplied to the brewing chamber 5 through the annular gap 14 during the brewing operation. The water flows through the ground coffee in the brewing chamber 5, scalds it, and reaches a further connection fitting 35 as coffee through the strainer 32 of the first piston 3 and via a liquid conduit 34 disposed on the side of the strainer 32 remote from the brewing chamber 5. Through the feeding of the hot pressurized water to the annular gap 14, this gap is cleansed of any previous ground coffee residues. It is conspicuous in FIG. 1 that the end face 13 of the second piston 4 designed without a strainer is substantially simpler to manufacture than the end face 12 of the first piston 3 provided with the strainer 32 and the attachment clip 33.

FIG. 2 shows an enlarged representation of the brewing cylinder 1 with the end of the second piston 4 inside the latter. The first piston 3 is depicted in broken lines, likewise with a strainer-less design of its end face 40. In FIG. 2, the brewing position is shown, in which the brewing chamber 5 is surrounded by the brewing cylinder 1 and the two pistons 3, 4. In the region of the annular gap 14 of the second piston 4, the already previously mentioned through bore 17, which extends outwardly of the brewing cylinder to a connection fitting 18, is shown. The through bore 17 penetrates the wall 15 of the brewing cylinder 1 substantially at right angles to the brewing cylinder axis 16. The through bore 17 may as well be directed radially toward the brewing cylinder or may run substantially tangent to the outside surface 7 of the second piston 4. Positions in between are likewise possible. With a nearly tangentially directed course of the through bore 17, practically no eddies occur upon feeding of pressurized water. The annular gap 14 is in this case flushed through substantially screw-threadedly by the pressurized water supplied. A uniform flow-through of the ground coffee in the brewing chamber 5 and a first-rate self-cleaning of the annular gap 14 are thereby ensured. The first piston 3 is merely indicated in broken lines. It is designed similarly to the second piston 4. A further gap 20 is formed between the end face 40 of the first piston 3 and its associated gasket 10. A second through bore designated as 21 extends through the wall of the brewing cylinder 1. Outwardly the second through bore 21, analogously to the through bore 17, is connected to a connection fitting 39. Along the brewing cylinder axis 16, the through bores 17, 21 are so disposed that they are in the region of the said gaps 14, 20 when the two pistons 4, 3 are in the brewing position shown.

The end face 13 of the second piston 4 is made cambered. This above all because of the stripping device 31, only indicated in FIG. 1, which carries out an orbital-shaped swivel movement for stripping the leached-out cake of ground coffee off the said end face 13. In the design shown in FIG. 2, through the cambering of both the end face 13 of the second piston 4 and the end face 40 of the first piston 3, a more uniform flow-through of the ground coffee by the pressurized hot water is achieved than would be the case with plane end faces. Through the cambering of the end faces 13, 40, that is, the flow resistance of the pressurized water in the region of the brewing cylinder axis 16 can additionally be reduced.

As was already mentioned by way of introduction, it is of advantage in the embodiment shown in FIG. 2 if the hot-water feed and the coffee discharge via the connection fittings 18, 39 are periodically reversed. In this way, a self-cleaning operation, maintenance-free for a long period of time, is ensured. The strainer 32 still shown in FIG. 1 has additionally been eliminated. A further reduction of the wearing parts and a further simplification of manufacture has thereby taken place.

We claim:

1. Brewing apparatus for a coffee machine, comprising a brewing cylinder (1) having a cylindrical bore (2), a pair of pistons (3, 4) mounted within and closing the cylindrical bore (2) to form a brewing chamber (5), the brewing cylinder (1) and the pistons (3, 4) being displaceable relative to one another along a brewing cylinder axis (16), and each of the pistons (3, 4) having on its outside surface (6, 7) a groove (8, 9) extending about the entire circumference with an inserted gasket (10, 11) for sealing the piston (3, 4) in relation to the cylindrical bore (2), characterized in that at least one of the pistons (4) has a reduced diameter between an end face (13) and its gasket (11) to provide an annular gap (14) between the piston (4) and the bore (2), whereby said gap (14) provides an annular passage for the feeding and/or discharge of liquid to and/or from the brewing chamber (5).

2. Apparatus according to claim 1, characterized in that in a wall (15) of the brewing cylinder (1) there is at least one through bore (17) running substantially at right angles to the brewing cylinder axis (16) for the feeding and/or discharge of the liquid to and/or from the gap (14).

3. Apparatus according to claim 2, characterized in that the through bore (17) extends on the side remote from the cylindrical bore (2) to a fitting (18) for connecting a conduit (19).

4. Apparatus according to claim 2 or 3, characterized in that the through bore (17) is disposed along the brewing cylinder axis (16) at the place at which the annular gap (14) of the respective piston (4) is situated during the brewing operation.

5. Apparatus according to claim 2 or 3, characterized in that at each of the pistons (3, 4) there is an annular gap (14, 20) in the said region, and that with each of the gaps (14, 20) a through bore (17, 21) is associated in such a way that each of the gaps (14, 20) is in the region of one of the through bores (17, 21) during the brewing operation.

6. Apparatus according to claim 2, characterized in that the through bore (17, 21) is directed radially to the bore (2) of the brewing cylinder (1).

7. Apparatus according to claim 2, characterized in that the through bore (17, 21) is directed substantially tangent to the bore (2) of the brewing cylinder (1).

8. Apparatus according to claim 1, characterized in that the end face (13, 40) of each piston (3, 4) at which there is an annular gap (17) has a surface without a strainer.

* * * * *